United States Patent [19]
Agarwal et al.

[11] Patent Number: 5,842,196
[45] Date of Patent: Nov. 24, 1998

[54] DATABASE SYSTEM WITH IMPROVED METHODS FOR UPDATING RECORDS

[75] Inventors: Sunil Agarwal, Alameda; Vasudha Krishnaswamy, Redwood City, both of Calif.

[73] Assignee: Sybase, Inc., Emeryville, Calif.

[21] Appl. No.: 626,093

[22] Filed: Apr. 3, 1996

[51] Int. Cl.⁶ .................................................. G06F 17/30
[52] U.S. Cl. ...................... 707/2; 707/1; 707/4; 707/10; 707/100; 707/102; 1/1; 364/282.1; 364/282.4; 364/283.1; 364/283.4
[58] Field of Search .................... 395/602; 1/1; 707/2, 707/10, 4, 102, 100, 1; 364/283.4, 282.4, 282.1, 283.1

[56] References Cited

U.S. PATENT DOCUMENTS

| | | | |
|---|---|---|---|
| 4,606,002 | 8/1986 | Waisman et al. | 364/200 |
| 4,677,550 | 6/1987 | Ferguson | 364/300 |
| 4,791,561 | 12/1988 | Huber | 364/300 |
| 4,805,099 | 2/1989 | Huber | 364/200 |
| 4,947,320 | 8/1990 | Crus et al. | 364/200 |
| 5,089,952 | 2/1992 | Bozman | 395/725 |
| 5,115,392 | 5/1992 | Takamoto et al. | 395/650 |
| 5,123,104 | 6/1992 | Levine et al. | 395/600 |
| 5,163,148 | 11/1992 | Walls | 395/600 |
| 5,204,958 | 4/1993 | Cheng et al. | 395/600 |
| 5,265,244 | 11/1993 | Ghosh et al. | 395/600 |
| 5,430,869 | 7/1995 | Ishak et al. | 395/600 |
| 5,493,728 | 2/1996 | Solton et al. | 395/250 |
| 5,504,888 | 4/1996 | Iwamoto et al. | 395/600 |
| 5,555,389 | 9/1996 | Satoh et al. | 395/427 |
| 5,581,765 | 12/1996 | Munroe et al. | 395/677 |

OTHER PUBLICATIONS

Comer, D., "*The Ubiquitous B–Tree*" Computing Surveys, Jun. 1979, pp. 121–137.
Stevens, A., "*HYPERTREE: A Hypertext Index Technique,*" Dr. Dobb's Journal, Jun. 1990, pp. 135–136, 138–140, 154, 156–159.
Baker, M., "B–tree indexing, A look at indexing tradeoffs in dBASE, Clipper, and FoxPro," Programmer's Journal, Nov./Dec. 1990, pp. 42–46.
Ferguson, D., "*Bit–Tree,*" Communications of the ACM, Jun. 1992, pp. 115–120.
Williams, W., "*Supercharging Sequential Searches, Speed plus compression equals faster searches,*" Dr. Dobb's Journal, Dec. 1990, pp. 54–61.
Lomet et al., "Node Deletion in the hB–Tree", IEEE, pp. 1–15, Jan. 1994.
Johnson et al., "A distribution data–balanced dictionary based on the B–link Tree", MIT, pp. 1–19, Feb. 1992.
Johnson et al., "Lazy updates for distributed search structures", U Florida, pp. 1–21, Dec. 1992.
Ferrandina et al., "Implementing lazy database updates for an object database system", IEEE, Jul. 1995.

*Primary Examiner*—Thomas G. Black
*Assistant Examiner*—Jean M. Corrielus
*Attorney, Agent, or Firm*—John A. Smart

[57] ABSTRACT

Database system and methods are described for updating records, such as are commonly used in a relational database environment. Updates are carried out in a manner which allows a substantial portion of the work to be performed in direct mode (when possible), thereby avoiding the inefficiency of re-reading records. In this fashion, a scenario which requires deferred updating can, in accordance with the present invention, be treated mostly as a direct update, with minimal deferred updating. Given a query involving an "unsafe" unique index (i.e., query includes update to key field), for instance, the present invention provides a method whereby each data row is updated in direct mode. In conjunction with this, the corresponding index row is deleted in direct mode. The system will not insert an index row at this point, however. Instead, updating of the index is deferred. The index is inserted later during the deferred or default mode. By updating data rows in direct mode (when possible), system performance is enhanced.

26 Claims, 13 Drawing Sheets

Microfiche Appendix Included
(1 Microfiche, 25 Pages)

DATABASE SYSTEM WITH IMPROVED METHODS FOR UPDATING RECORDS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

MICROFICHE APPENDIX

A single-fiche Microfiche Appendix, containing 25 frames, is included with this application.

BACKGROUND OF THE INVENTION

The present invention relates generally to information processing environments and, more particularly, to the process of updating information stored in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more sever-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif.

As the migration to client/server continues, each day more and more business are run from mission-critical systems which store information on server-based SQL database systems, such as Sybase SQL Server™. As a result, increasingly higher demands are being placed on server-based SQL database systems to provide enterprise-wide decision support. Since reducing the time required for processing queries improves system performance, it is highly desirable to optimize queries. Without further optimization, processing of a query in real-time can be particularly burdensome, especially since a relatively high number of computations and possibly disk or network input/output operations must be performed in order to evaluate each row of the table or tables under examination. Accordingly, there is much interest in improving the performance of such systems, particularly in terms of query execution speed.

SUMMARY OF THE INVENTION

The present invention comprises a Client/Server Database System with improved methods for performing record updates, such as those which occur during an update query. In an exemplary embodiment, the system includes one or more Clients (e.g., Terminals or PCs) connected via a Network to a Server. The Server, operating under a server operating system (e.g., UNIX) includes a Database Server System, such as Sybase SQL Server™. In general operation, Clients store data in and retrieve data from one or more database tables resident on the Server by submitting SQL commands, some of which specify "queries" —criteria for selecting records of a table for a particular operation (e.g., updating).

Given a query that can update multiple rows (i.e., "update" query), one of two approaches is generally adopted. In a first approach, a system typically updates records in a linear fashion, one by one. After the last of these records has been updated, the system is done. In a second approach, a system first marks those rows or records which require updating. In a second pass, the system then proceeds to update the records, one by one. The first or "direct update" approach is performed in one pass and, thus, is faster. The second or "deferred update" approach occurs in two passes and, hence, is more expensive.

In day-to-day database usage, scenarios arise in which the direct approach has not conventionally been employed. One such example is an update which expands a record such that the data page on which the record is stored "splits" —that is, is divided into two separate pages, for accommodating the additional information. When a page split occurs, rows "move around." Here, certain rows of the old page might be moved to the new page; the particular rows which actually move depend on the given splitting methodology employed.

The present invention accomplishes both by performing as much work in direct mode as possible. Here, the system minimizes work which occurs in deferred mode, thereby enhancing the speed in which the system performs update queries. In this manner, the present invention minimizes or eliminates re-reading of rows which have already been processed once.

Consider, for instance, a query involving an "unsafe" index (i.e., query includes update to key field). Here, the present invention provides a method whereby each data row is updated in direct mode. In conjunction with this, the corresponding index row is deleted in direct mode. The system will not insert an index row at this point, however. Instead, updating of the index is deferred. The index is inserted later during the deferred or default mode. By updating data rows in direct mode (when possible), system performance is enhanced.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
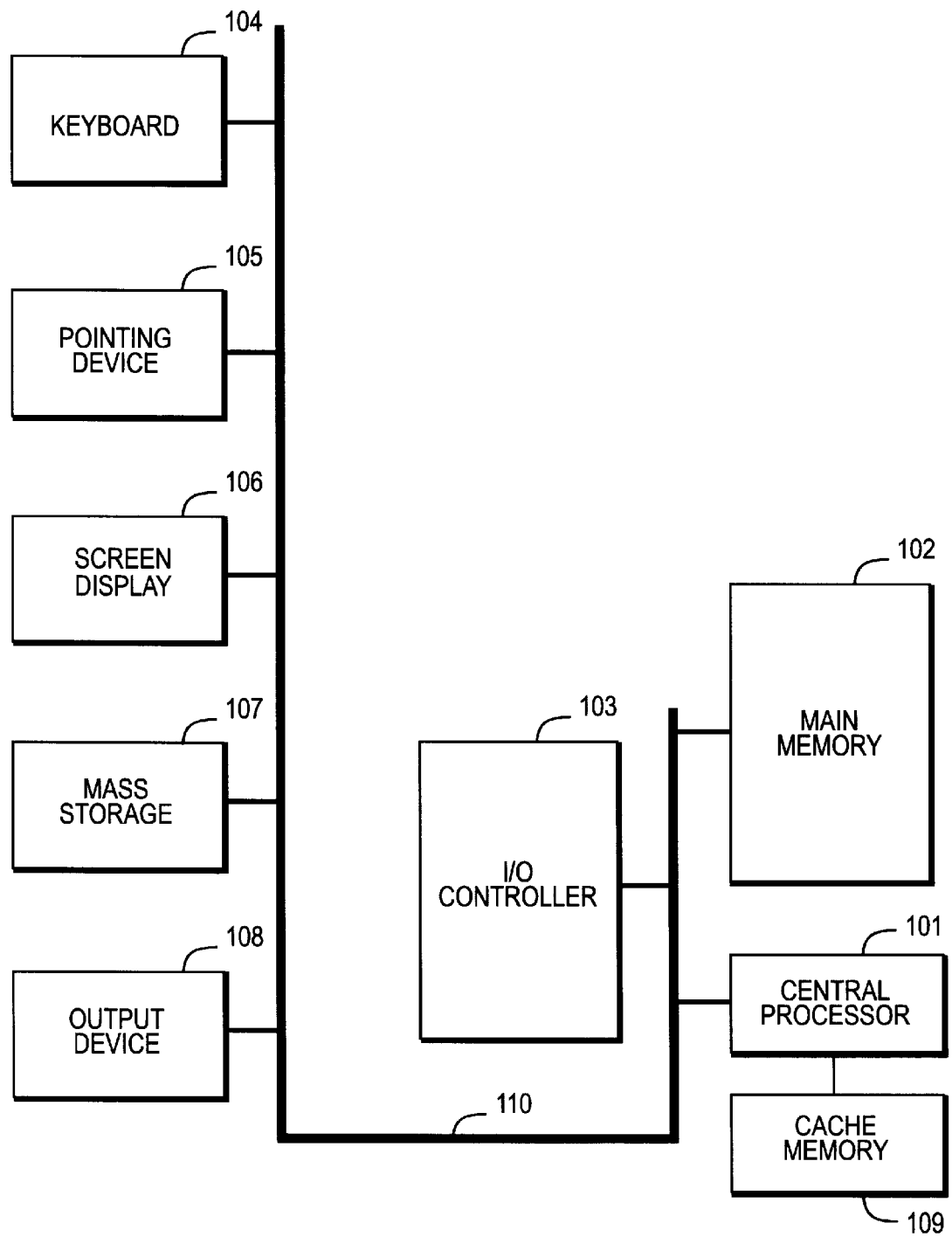
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a persistent or mass storage 107 (e.g., hard or fixed disk, removable or floppy disk, optical disk, magneto-optical disk, and/or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
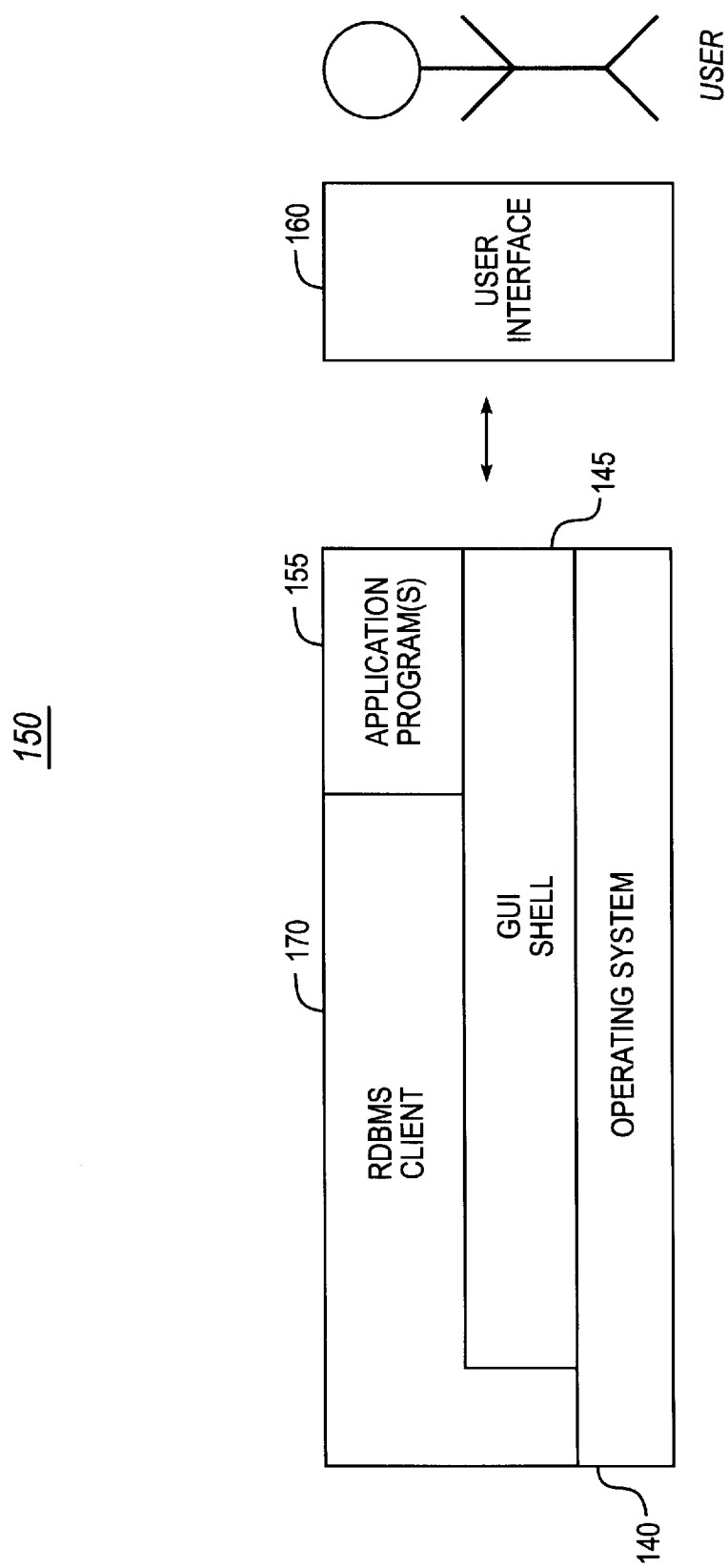
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a GUI (graphical user interface) shell 145. One or more application programs, such as application software 155, may be "loaded" (i.e., transferred from storage 107 into memory 102) for execution by the system 100. The system also includes a UI (user interface) 160 for receiving user commands as input and displaying user data as output. Although shown as a separate component, the UI 160 is typically provided by the GUI operating under the control of the OS 140, program(s) 155, and Relational Database Management System (RDBMS) client 170. The RDBMS client or "front-end" 170 itself may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/Server Database Management System

Figure 2A:
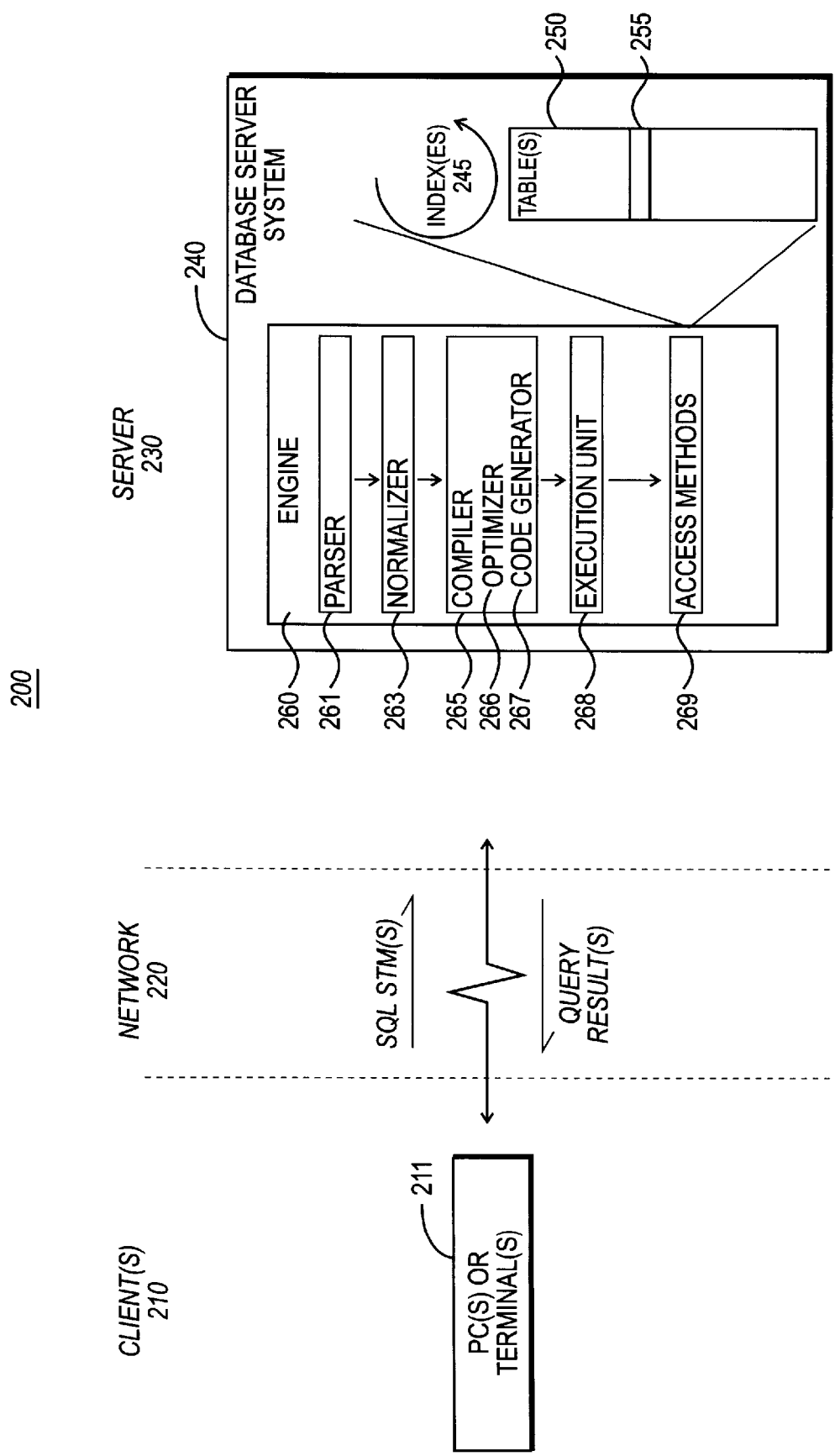
FIG. 2A is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2A illustrates the general structure of a Client/Server Database System 200 which is preferred for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (Sybase, Inc. of Emeryville, Calif.) in an exemplary embodiment, generally operates as an independent process (i.e., independently of the clients) running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client SQL calls and its parameters into a format (of one or more packets) suitable for transmission across a cable or wire, for delivery to the Database Server 240.

Client/server environments, database servers, and networks are well documented in the technical, trade, and patent literature. For a general discussion of database servers and client/server environments, see, e.g., Nath, A., *The Guide to SQL Server*, Second Edition, Addison-Wesley Publishing Company, 1995. For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl.

Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2A. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

During a database session or "connection" with the Server, each Client issues one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned An Introduction to Database Systems. In addition to retrieving the data from Database Server tables, the Clients also include the ability to insert new rows of data records into the table; Clients can also modify and/or delete existing records in the table.

During system operation, the SQL statements received from the one or more Clients 210 (via Network 220) are processed by Engine 260 of the Database Server System 240. The Engine 260 itself comprises a Parser 261, Normalizer 263, Compiler 265, Execution Unit 268, and Access Methods 269. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator 267, on the other hand, converts the query tree into a set of instructions suitable for satisfying the query. These instructions are passed to the Execution Unit 268. Operating under the control of these instructions, the Execution Unit 268 generates calls into lower-level routines, such as the Access Methods 269, for carrying out the query-specified operation, such as fetching relevant information (e.g., row 255) from the database table 250. After the plan has been executed by the Execution Unit, the Server returns a query result or answer table back to the Client(s).

For enhancing the speed in which the Database Server stores, retrieves, and presents particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. As clients insert more and more data into a particular one of the table(s) 250, a corresponding one of the index(es) 245 continues to grow. Before describing the methods of the present invention for improving the updating of records (i.e., "update queries"), it is helpful to examine further the general methodology for storing and indexing data records in a database system.

Data pages and indexes

A. Data pages and page chain

Figure 2B:
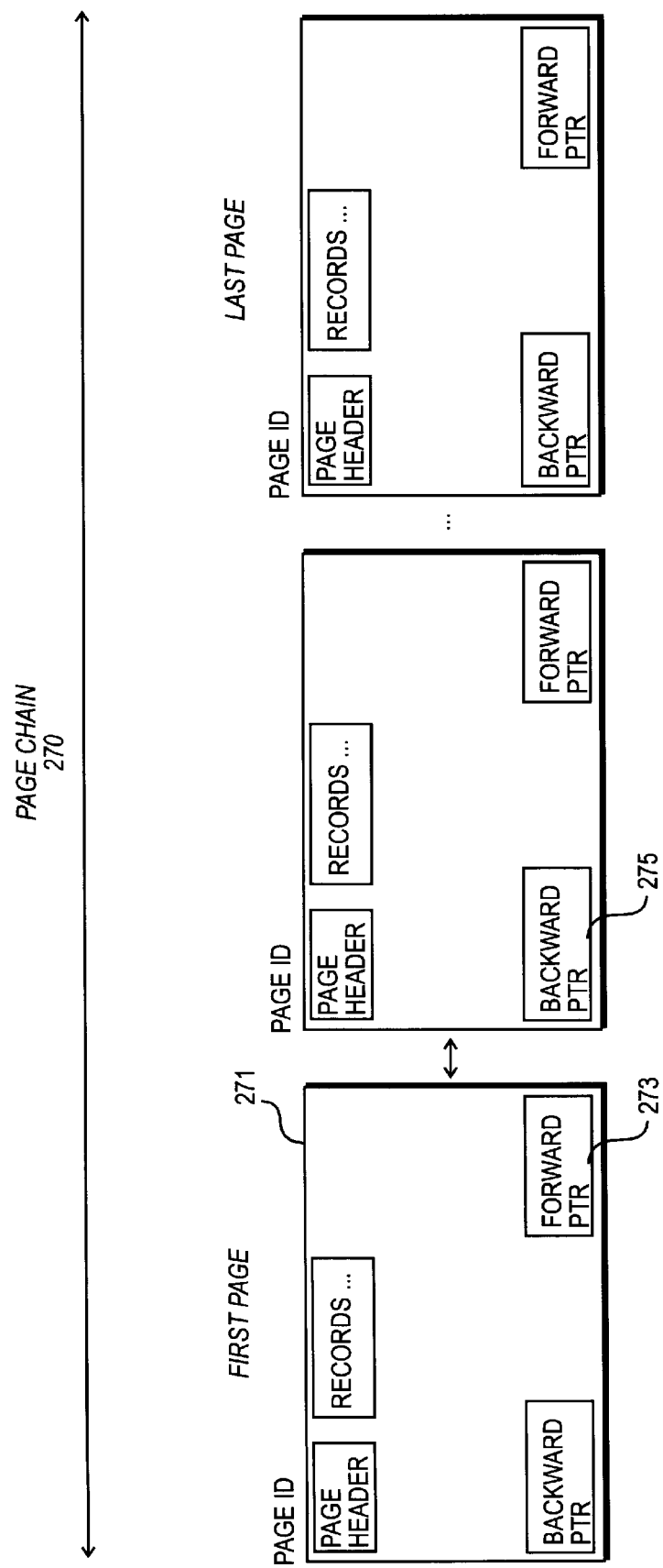
FIG. 2B is a diagram illustrating a "data page" structure.

As shown in FIG. 2B, the data records or rows of a database table are actually stored in a particular structure known as a "data page." A data page may be viewed as a storage unit (e.g., 2K storage block) which holds one or more records, such as page 271. When a data page is "full," typically on the order of about 50 to 100 records, it is necessary to allocate a new data page. Every page which is allocated is linked to its previous and next neighboring pages via forward and backward page pointers (e.g., pointers 273, 275), so that logically a linked list or "chain" of pages exists. This forms the "page chain," such as the page chain 270 shown in FIG. 2B. Typically, identifiers or "Page IDs" for the first and last page of a page chain are maintained in a system catalog for the database.

Conventionally, only a single page chain is employed for a given object. A more advanced approach is to employ multiple page chains for a given object. Such an approach is described in commonly-owned, co-pending application Ser. No. 08/537,020, DATABASE SYSTEM WITH METHODS FOR PARTITIONING AN OBJECT INTO MULTIPLE PAGE CHAINS, filed Oct. 2, 1995, the disclosure of which is hereby incorporated by reference.

B. Indexes

1. B-Trees

Locating a particular record or set of records by performing a sequential or linear scan from one end of a database table, comparing each record along the way, is an expensive operation. With such an approach, all of the blocks or pages of records would have to be visited until the record sought is finally located. For a table of even moderate size, such an approach yields unacceptable performance. As a result, virtually all modern-day relational database systems employ B-Tree indexes or a variant.

Figure 2C:
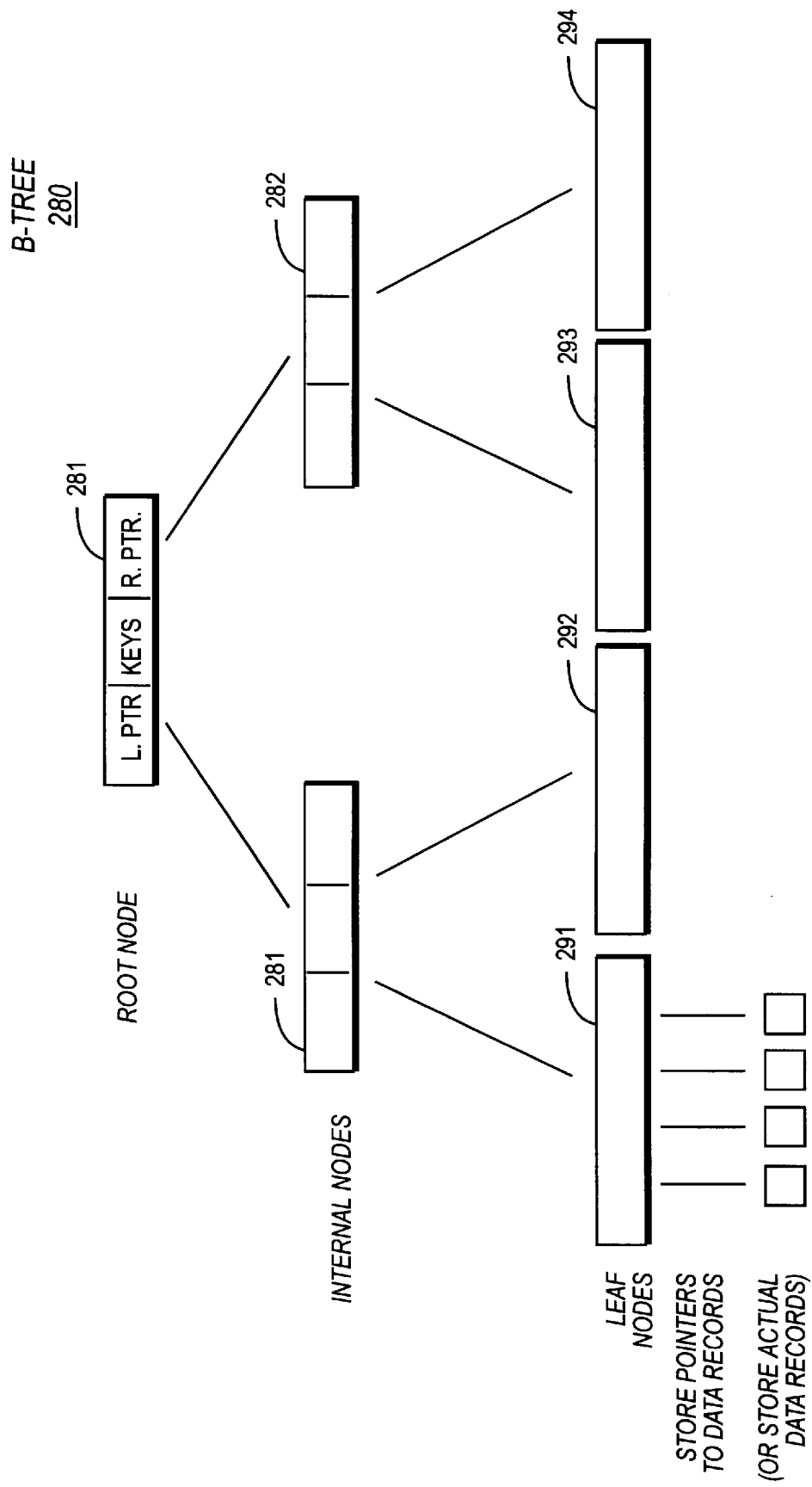
FIG. 2C is a diagram illustrating a simple B-Tree.

FIG. 2C illustrates a simple B-Tree 280, which comprises a Root Node 281, Internal Nodes 281, 282, and Leaf (terminal) Nodes 291, 292, 293, 294. As shown, therefore, a B-Tree consists of a plurality of nodes arranged in a tree. Each node may, in turn, be thought of as a block of records. As shown by the Root Node 281, each node stores one or more key values ("keys") together with pointers to left and right children nodes (e.g., Nodes 281, 282 for Root Node 281).

Searching for a particular record with the help of a B-Tree occurs by traversing a particular path in the tree. To find a record with a particular key value, one would maneuver through the tree comparing key values stored at each node visited with the key value sought. The results of each comparison operation, in conjunction with the pointers stored with each node, indicate which path to take through the tree to reach the specific record desired. Ultimately, a search will end at a particular leaf node, such as leaf node 291. For a simple or "non-clustered" index, the leaf node will, in turn, point to (i.e., store a pointer to or identifier for) a particular data record for the key value sought.

For a "clustered index," on the other hand, the actual data of the data records are stored on the leaf nodes themselves. In other words, a clustered index is one in which the data of the table (i.e., data pages) are put directly on the leaf-level nodes of the B-Tree. This is in contrast to the abovementioned non-clustered index where the leaf nodes store only pointers to the actual data pages (which, because of their large size, are generally loaded as a heap, as needed). Present-day examples of systems employing clustered indexes include, for instance, Paradox® from Borland International of Scotts Valley, Calif. and Sybase SQL Server™ from Sybase, Inc. of Emeryville, Calif. Typically, such systems employ clustered indexes in addition to, not in lieu of, non-clustered indexes.

General techniques for the construction and operation of B-Trees are well documented in the technical, trade, and patent literature. For a general description, see Sedgewick, R., *Algorithms in C*, Addison-Wesley, 1990. For a description of B-Tree indexes implemented in a PC DBMS system, see Baker, M., *B-tree indexing: A look at indexing tradeoffs in dBASE, Clipper, and FoxPro*, Programmer's Journal, Vol. 8.6, November/December 1990, pp. 42–46. Also, see SYSTEM AND METHODS FOR INFORMATION RETRIEVAL, International Application No. PCT/US91/07260, International Publication No. WO92/06440, Apr. 16, 1992, which describes B-Tree indexes for Fox® PC DBMS software. Multiple index files, including dBASE's .mdx files, have also been described in the technical literature; see e.g., Freeland, R., *Exploring MDXs*, Data Based Advisor, February 1991, pp. 85–87. The disclosures of each of the foregoing references are hereby incorporated by reference.

2. B-Tree maintenance

Maintenance of B-Trees is fundamental to the operation of indexes in a database system. As new data records are loaded in a database table, the index (and corresponding in-memory B-Tree) for that table grows, to accommodate the new records. As a new record is added to a table, a corresponding index entry (typically, index key value plus record identifier) is added to an appropriate slot in the appropriate B-Tree node (i.e., the node which is appropriate for the key value expressed by the record). Since the nodes of the B-Tree have a finite size (generally, limited by the size of the database page employed), when an update operation occurs which exceeds the capacity of a particular node, an "overflow" condition exists at the node.

A node overflow is handled by splitting the particular node into two parts, for storing the new information (i.e., for storing the additional key value/record identifier for the new data which is being added). For data insert or update operations which are random, splitting the node "down the middle" yields good, and often optimal, results. For non-random ones, splitting can be optimized based on the particular load pattern of the update. Such as approach is described in commonly-owned, co-pending application Ser. No. 08/497,663, DATABASE SYSTEM WITH IMPROVED METHODS FOR B-TREE MAINTENANCE, filed Jun. 28, 1995, the disclosure of which is hereby incorporated by reference. Similar to a B-Tree node or page, a data page may overflow. In a corresponding manner, the data page may be split into two (or more) separate pages for accommodating the new data.

Of particular interest to the present invention is the optimization of query execution in the presence of updates, particularly those which lead to significant splitting of index and/or data pages. When a page splits, current "position" may be lost. Modification of the Engine 260 for achieving this optimization will now be described in further detail.

Improved updating of records

A. Direct and Deferred modes of updating

Given a query that can update multiple rows (i.e., "update" query), one of two approaches is generally adopted. In a first approach, a system typically updates records in a linear fashion, one by one. After the last of these records has been updated, the system is done. In a second approach, a system first marks those rows or records which require updating. In a second pass, the system then proceeds to update the records, one by one. The first or "direct update" approach is performed in one pass and, thus, is faster. The second or "deferred update" approach occurs in two passes and, hence, is more expensive.

In day-to-day database usage, scenarios arise in which the direct approach has not conventionally been employed. Consider, for instance, the following scenario. Suppose that an update occurs which expands a record such that the data page on which the record is stored "splits" —that is, is divided into two separate pages, for accommodating the additional information. When a page split occurs, rows "move around." Here, certain rows of the old page might be moved to the new page; the particular rows which actually move depend on the given splitting methodology employed. Regardless of the method, movement of rows leads to loss of the "current position" (i.e., the particular row).

Figure 3A:
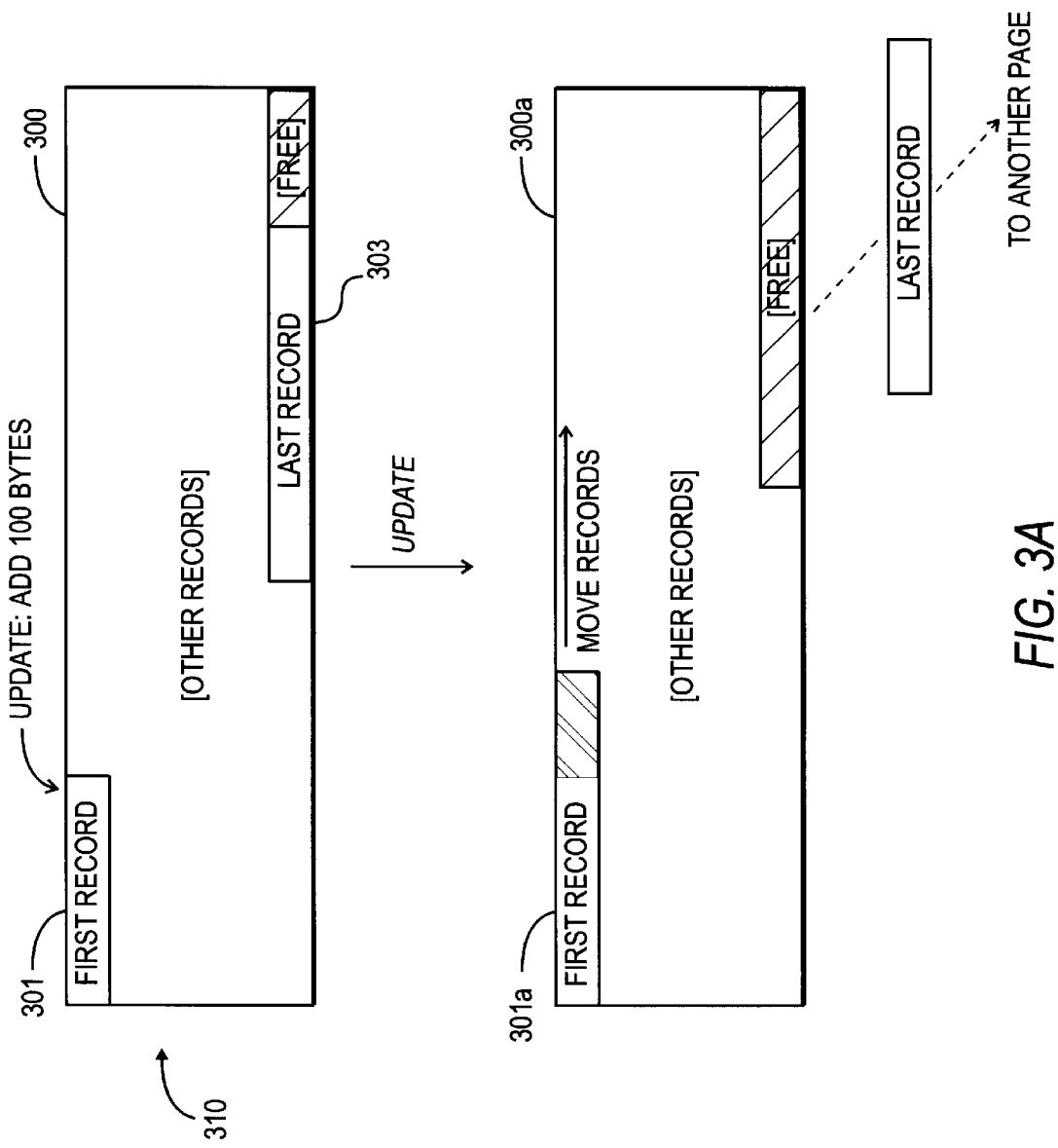
FIG. 3A is a block diagram illustrating how rows can move leading to loss of "current position."

This problem is illustrated diagrammatically in FIG. 3A. Consider data page 300 which comprises a plurality of data records or rows 310. Suppose further that an update query is received which specifies that 100 bytes of information is added to one or more rows on the page (i.e., the one(s) which meet the query condition). An update to the first record 301 to create record 301 *a*, for example, causes subsequent records or rows to move. When no more room or "free space" is left on the page, the records which overflow are shifted to another page (or pages). For the update in FIG. 3A, for example, the last record 303 has been moved off page 300 (now shown as page 300*a*).

Page splitting—moving rows off the current page—is problematic for an update query. Specifically, the movement causes the system to lose the "position" which it was currently on. The deferred update can address the problem, by first marking the rows and then defering updating for these rows (i.e., ones which overflow) until all the rows qualifying have been marked or updated directly. The approach requires two-passes, however. Accordingly, a better approach is desired.

B. Optimized updating

1. Methodology overview

For optimizing performance, it is desirable to minimize query updates which occur in deferred mode. At the same time, however, if a table and its index(es) are correct before execution of the query statement, they should continue to be correct once execution of the query statement has completed. In other words, these structures should continue to satisfy all of the constraints (e.g., entity integrity or primary key constraint) that have been imposed. The present invention accomplishes both by performing as much work in direct mode as possible. Update queries which were conventionally processed by deferred updating can now (when possible) be processed in a manner which is largely a direct update operation. In this manner, the present invention minimizes or eliminates re-reading of rows which have already been processed once. Application of the invention to specific types of update queries will next be described.

2. Update with direct delete and deferred insert

Recall the problem posed by the query of FIG. 3A. There, an update to one or more records caused subsequent records or rows to move. The present invention provides an update strategy which leads to the least amount of movement of rows on a page. Instead of updating a row which may lead to a page split, the system of the present invention instead deletes the row, thereby preserving the position of other rows on that page.

Figure 3B:
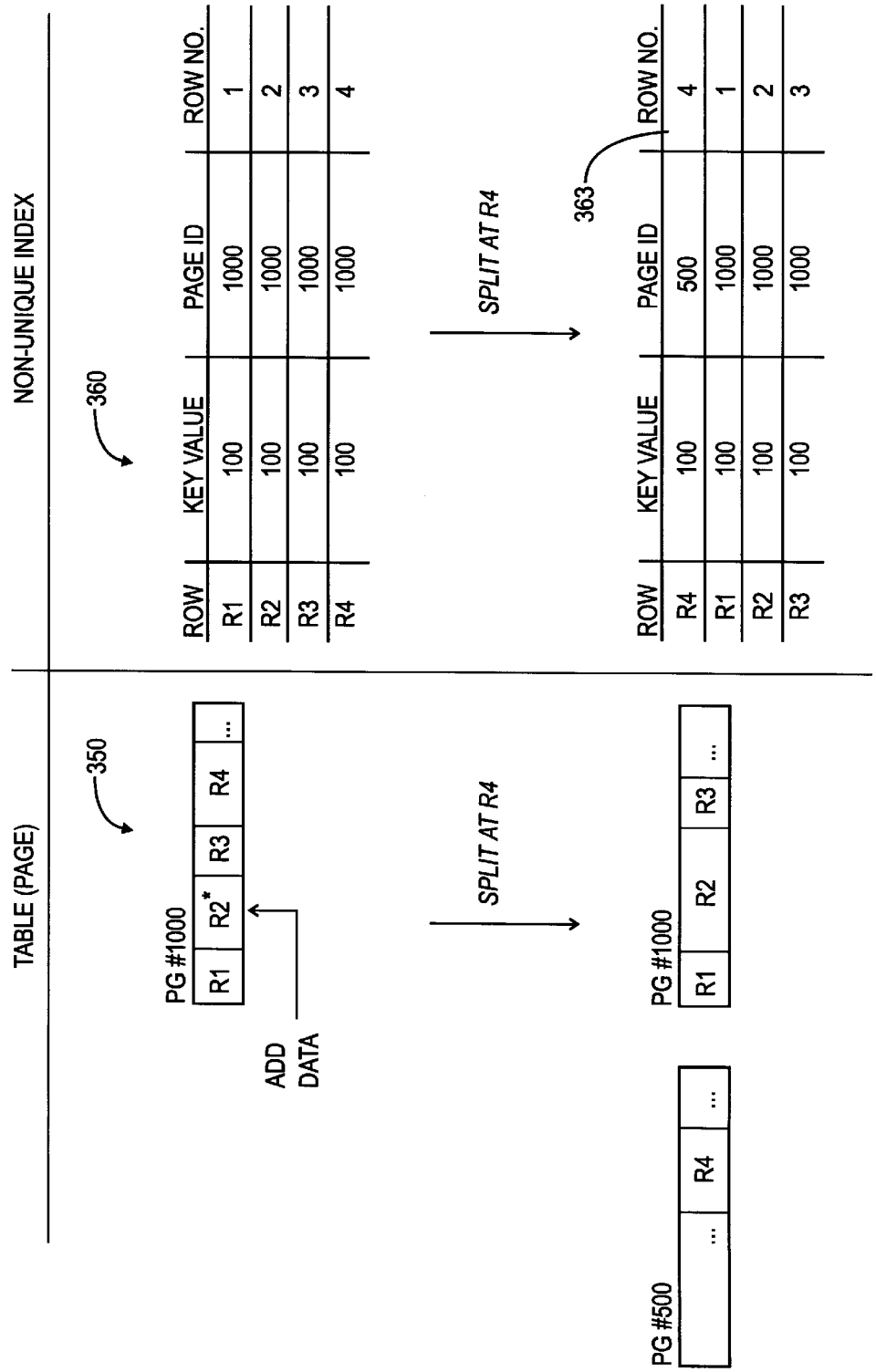
FIG. 3B is a diagram illustrating movement of rows in a page of a table having a non-unique index (i.e., stores duplicate key values).

Consider a data page 350, shown in FIG. 3B, which includes four rows: R1, R2, R3, and R4. Suppose the data page 350 only had 20 bytes of room left on the page and that a query is received to add 100 bytes of information to row R2, R3, and R4, such as:

update T1 set T1.C1=<value which adds 100 more bytes> where <qualify row R2, R3, and R4>

Here, row R2, once modified, will no longer fit on the page.

The problem of "losing position" occurs particularly in the instance of non-unique indexes. Suppose that records R1, R2, R3, and R4 each stores a duplicate key value of 100, as shown at 360 in FIG. 3B. Suppose further that the records are stored as part of a clustered index (i.e., the data pages are stored on the leaf-level nodes of the index). As shown initially at page 350, each row is stored on the same page, here Page #1000. Now consider the records after the page has been split at R4. R4 is stored on another page which is identified by another logical Page No., say Page #500 (i.e., a randomly available page). In the index, maintenance of the duplicate key values causes the index record for R4 to move to position 363 (using a non-unique, non-clustered index for scanning), as shown. In particular, although the records are sorted on the key value (i.e., the value of 100), in the instance of duplicate key values, the logical page ID and row number are also employed as part of the key (i.e., the key is extended to include the page ID and row number, for purposes of sorting). Accordingly, when record R4 is moved, it now comes before the other records since it has its logical Page ID equal to 500; this results in loss of position.

For purposes of updating, the scan should proceed in a forward direction, so that one can avoid scanning the same row twice. Thus, it is preferable to not lose position—that is, it is preferable to not allow a modified record to reposition itself during update so that the same row has to be scanned twice. Conventionally, the modification would be carried out in deferred mode. In accordance with the present invention, however, the row R2 is deleted in direct mode (with deletion of the index entry) followed by an insert of the data row in deferred mode. The corresponding index row is inserted in deferred mode. In this manner, the method can proceed without "losing position"—that is, the other rows have not moved out of the page (e.g., as a result of page splitting).

Figure 3C:
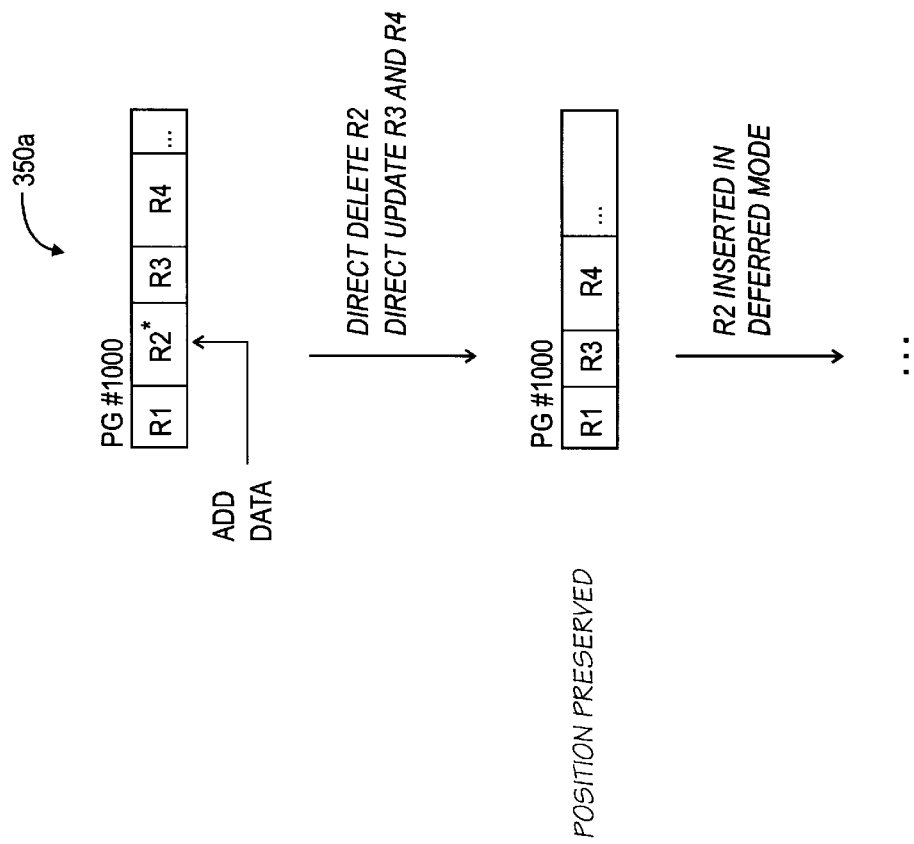
FIG. 3C is a block diagram illustrating a method of the present invention for updating records by deleting a record which would overflow a page and marking it for a deferred insert.

In accordance with the present invention, R2 is updated with a direct delete (i.e., delete in direct mode) and a deferred insert (i.e., insert in deferred mode). Accordingly, records R3 and R4 can be modified or updated in direct mode. This is illustrated by page P1, as shown at 350a in FIG. 3C. In contrast to the approach shown in FIG. 3B, record R2 has been deleted from the page. As a result, page position has been maintained for the remaining records (i.e., records R3 and R4).

Figure 3D:
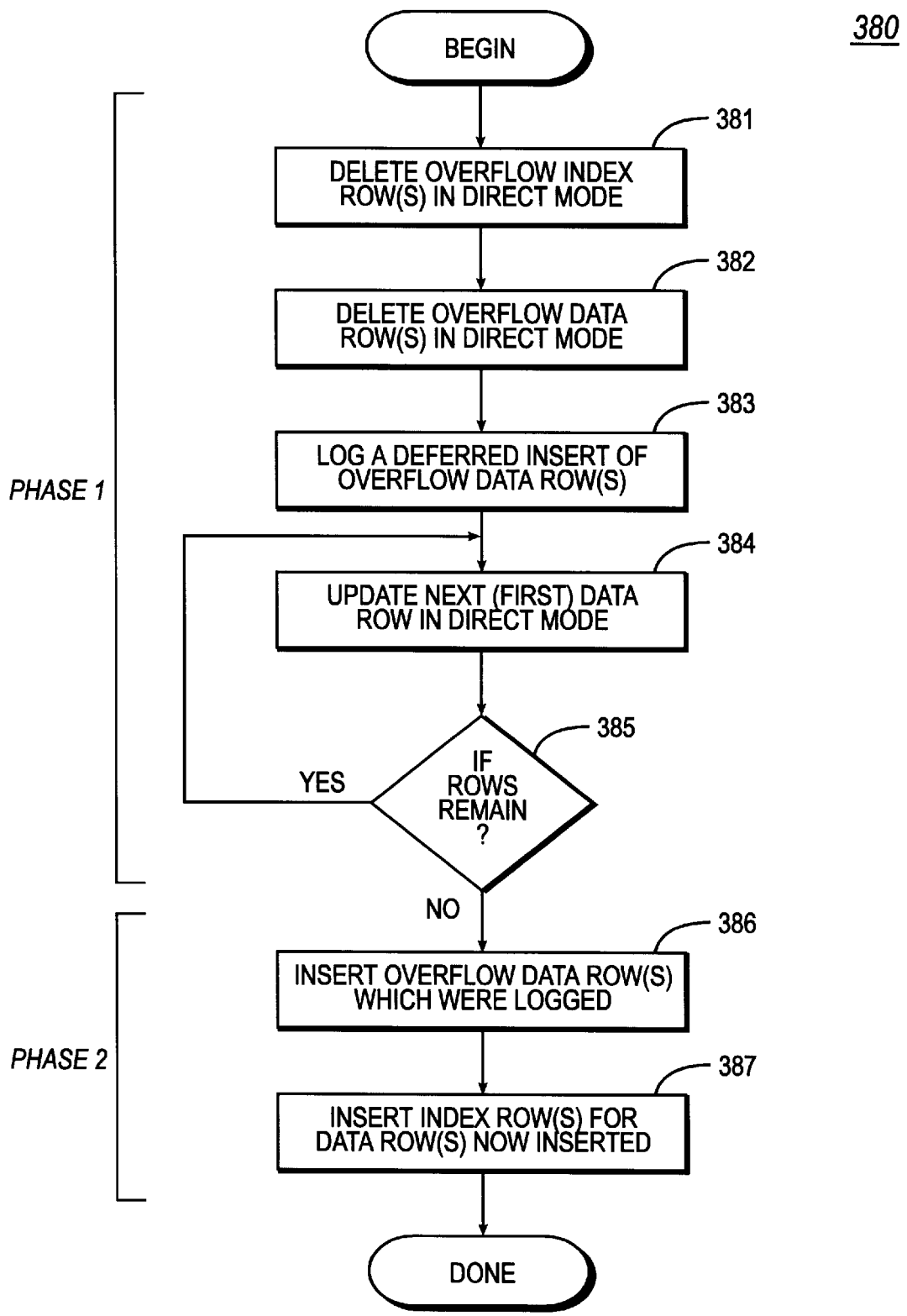
FIG. 3D is a flowchart illustrating a method of the present invention for updating records in a manner which maintains "position."

The present invention provides a method for updating records which maintains position. Illustrated in FIG. 3D, a method 380 of the present invention proceeds as follows. For clarity of description, the example focuses on a scenario where a single row overflows its data page (i.e., updates to other rows on the page do not lead to overflow). First, the method enters Phase 1. This is the phase where the method performs as much work as possible in direct mode—that is, at the point when each page has been initially read. In this phase, the index row for the record(s) which overflow the page (upon updating) is deleted in direct mode, as shown in step 381. Next, the corresponding data row(s) is deleted in direct mode, as shown in step 382. The method then marks or logs the row(s) for a deferred insert, at step 383. At step 384, the method updates in direct mode any other record(s) on the page which are modified. At step 385, the method loops back to step 384 if any records remain to be updated. At the conclusion of step 385, the method has completed Phase 1. Note particularly at this point that all data records have been updated in direct mode. Since position has been preserved for this page (and other similar pages), the page will not have to be re-read to complete query processing.

At step 386, the method enters Phase 2, for completing any remaining work in deferred mode. As shown in step 386, the only work which remains is to insert all data rows (and their corresponding index rows) which were logged or marked for deferred insert. Note that only those pages which receive the deferred inserts need be loaded. At step 387, the corresponding index rows are inserted.

The corresponding log records for this sequence of operations is as follows:

| ACTION | COMMENT |
| --- | --- |
| Phase 1: | |
| XREC_IDELETE (INDEX ON R2) | Delete index row R2 in direct mode |
| XREC_DELETE (R2) | Delete row R2 in direct mode |
| XREC_INOOP (MODIFIED R2) | Log deferred insert for row R2 |
| XREC_DELETE (R3) XREC_INSERT (R3) | Update row R3 in direct mode |
| XREC_DELETE (R4) XREC_IINSERT (R4) | Update row R4 in direct mode |
| Phase 2: | |
| XREC_INSERT (R2) | Insert row R2 in deferred mode |
| XREC_IINSERT (INDEX ROW R2) | Insert index row R2 in deferred mode |

As shown by the log records, the sequence of events is as follows. First, the index entry for R2 is deleted in direct mode. Next, the R2 record is deleted in direct mode. This is followed by logging a deferred update of R2. Phase 1 is completed by updating records R3 and R4 in direct mode as follows: delete R3, insert R3, delete R4, and insert R4. In phase 2, the system inserts the record for R2. Finally, the corresponding index row for R2 is inserted, thereby completing phase 2.

3. Application of methodology to "unsafe" unique indexes

Figure 4A:
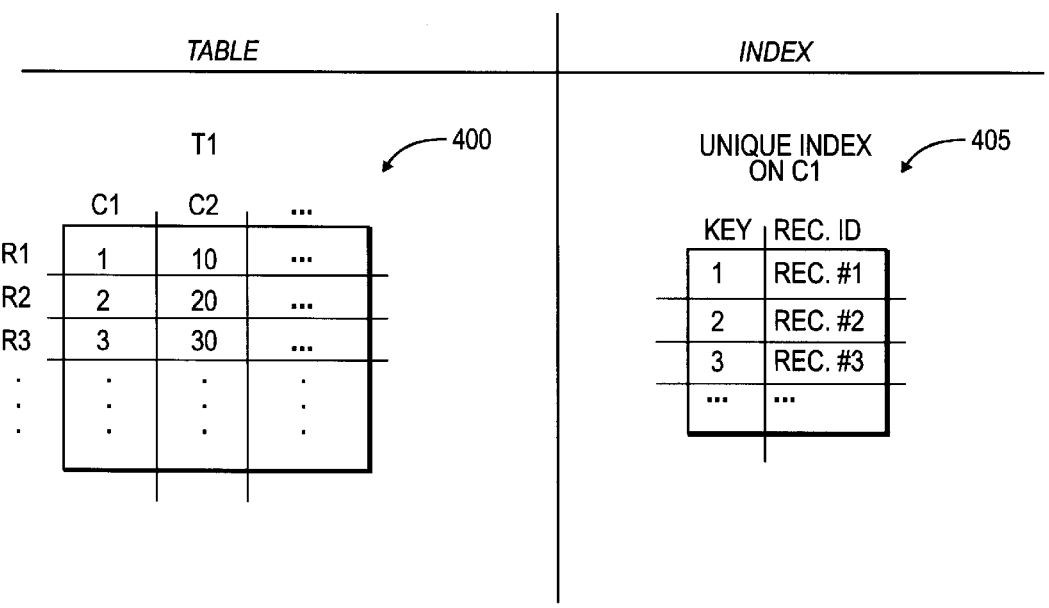
FIG. 4A is a diagram illustrating an update query which leads to an "unsafe" unique index.

An "unsafe" unique index is one in which a query affects values in a column (or columns) which form a unique index for a given table. A unique index itself is one in which each key value is unique. Consider, for instance, table T1 comprising column C1 and column C2, shown at 400 in FIG. 4A. For table T1 (400), in this example, there exists a unique, non-clustered index on column C1, as shown at 405. Consider the following SQL query:

```
update T1
set T1.C1=T1.C1+1
where <QUALIFY ALL>
```

As each record is being processed for the above query, the uniqueness constraint for the index is violated temporarily.

Figure 4B:
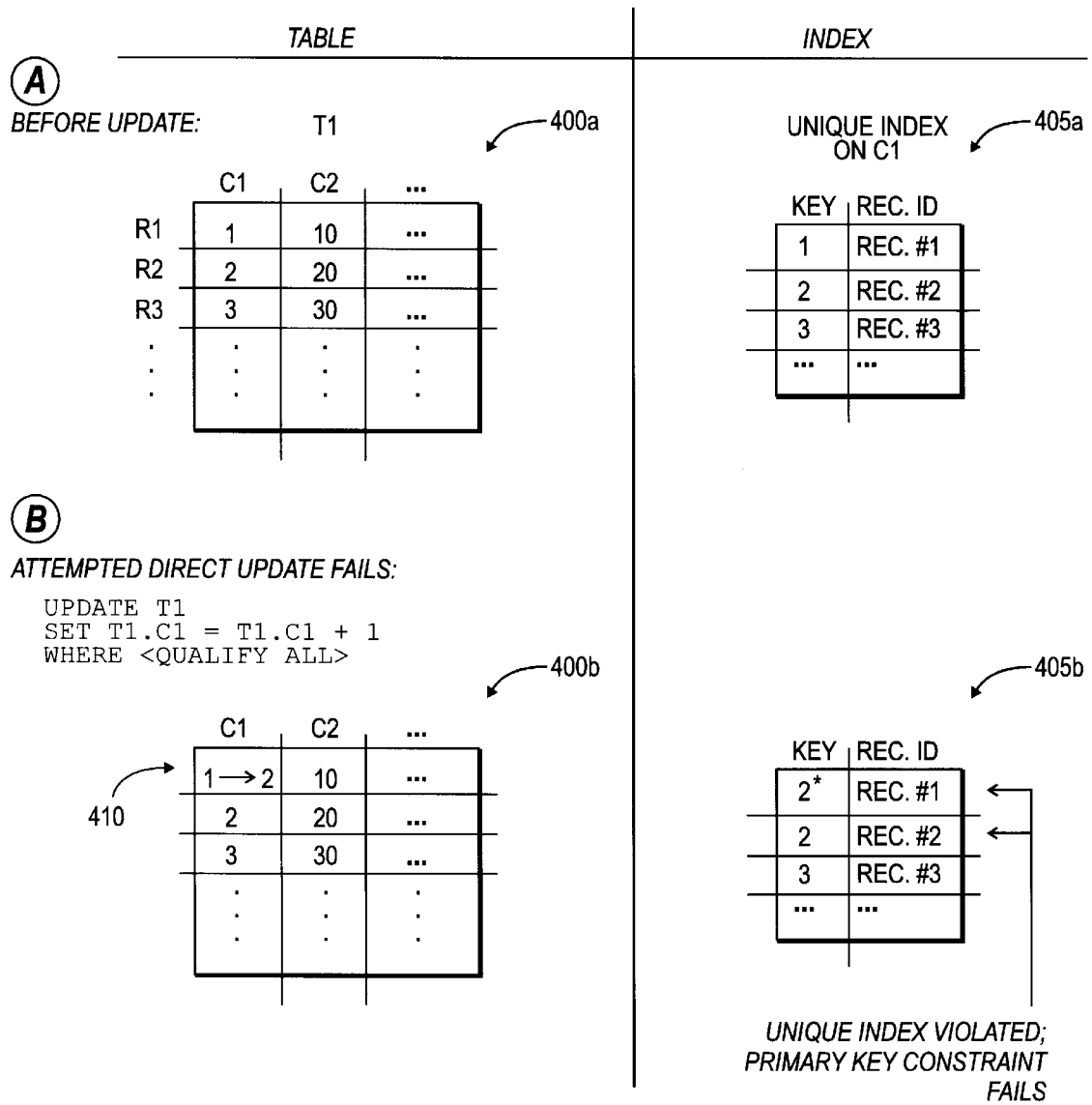
FIG. 4B is a diagram illustrating how the uniqueness constraint for a unique index is temporarily violated given the query shown in FIG. 4A.

This is illustrated in FIG. 4B. Table T1 (400), shown in logical view 400*a*, maintains a primary key in column C1. Specifically, the primary key is maintained via unique index 405, shown in its initial state at 405*a*. Given an update query which specifies that the value of 1 is added to the value stored at C1 for each row, the foregoing primary key (entity integrity constraint) will be violated during the update, as shown for the index (now 405*b*) for Table T1 (now 400*b*). This occurs at the particular point when a row which has just been updated stores a key value equal to the key value of another row which has yet to be updated. Initially, the R1 row or record stores the value of 1. During the update, the R1 record, now shown at 410, stores the key value of 2. This value conflicts, however, with the R2 record which also stores a key value of 2. At this particular point in time, the R2 record has yet to be updated. The violation of the primary key constraint is, however, an artifact of the update process, which proceeds on a row-by-row basis. Note that the R2 record itself will eventually be updated to a different value (i.e., 3). In a manner similar to that shown for the R2 record, the R3 record will, during its update, store a new key value which conflicts with the then-existing key value for the R4 record. In a conventional system, therefore, the query (i.e., one involving an unsafe unique index) entails an update which cannot be done in direct mode. It must, instead, be done in deferred update mode—that is, in two passes. The two-pass approach incurrs a substantial performance penalty: records which have already been read once will have to be re-read to complete processing.

Figure 5A:
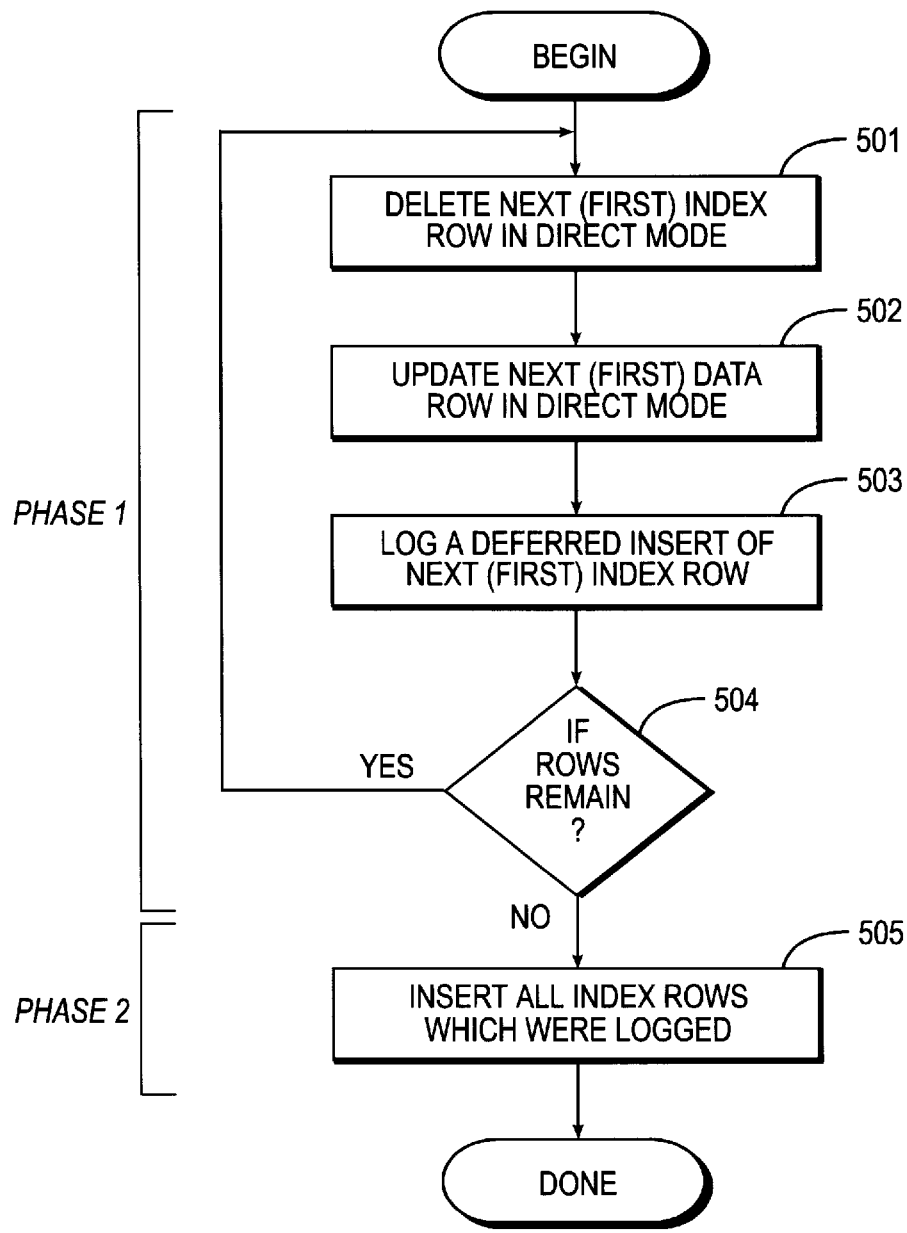
FIG. 5A is a flowchart illustrating a method of the present invention for updating records in the instance of an "unsafe" unique index.

The present invention, in contrast, provides a method for updating records which minimizes the need for re-reading records which have already been read. Illustrated in FIG. 5A, a method 500 of the present invention proceeds as follows. First, the method enters Phase 1. This is the phase where the method performs as much work as possible in direct mode—that is, at the point when each page has been initially read. In this phase, the index row for the first or next record being modified or updated is deleted in direct mode, as shown in step 501. Next, the corresponding data row for the first or next record being modified is updated in direct mode, as shown in step 502. The method then marks the index row for the first or next record being modified, as indicated by step 503. In particular, this is done at the step by "logging" a deferred insert of these index rows. At step 504, the method loops back to step 501 for any records which remain to be updated. At the conclusion of step 504, the method has completed Phase 1. Note particularly at this point that all data records have been updated in direct mode. As a result, the pages which store these records will not have to be re-read to complete query processing.

Next, the method enters Phase 2. Here, the method completes any remaining work in deferred mode. As shown in step 505, the only work which remains is to insert all index rows which were logged in step 503. This updates the index to its final, correct state. If a constraint is violated for other reasons (e.g., an update which violates the primary key constraint), the violation occurs at this point and will be caught. At the conclusion of step 505, both the table and its unique index have been correctly updated. Moreover, the update has been carried out in a manner which allows a substantial portion of the work to be performed in direct mode, thereby avoiding the inefficiency of re-reading records. In this fashion, a scenario which requires deferred updating can, in accordance with the present invention, be treated mostly as a direct update, with minimal deferred updating.

Figure 5B:
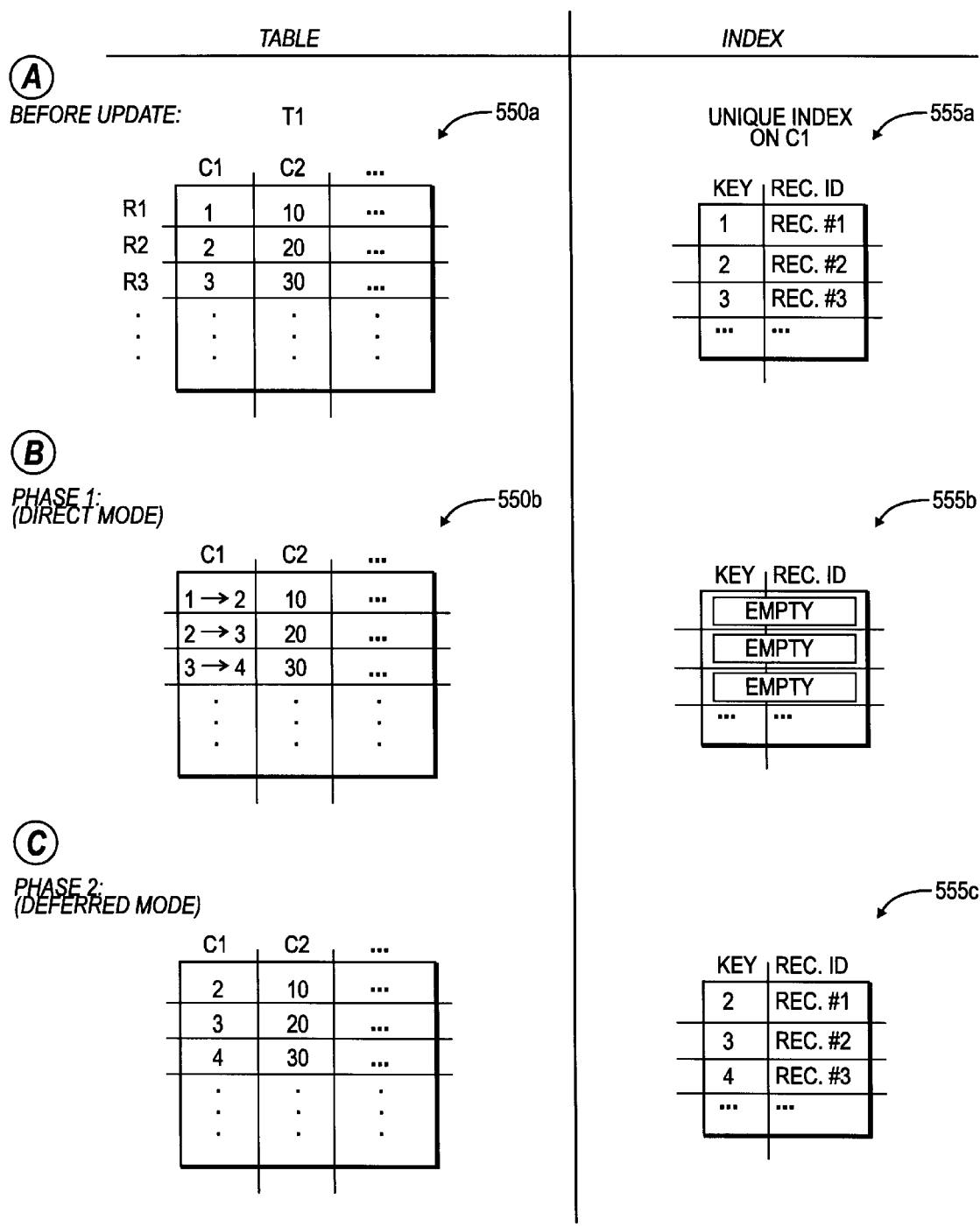
FIG. 5B is a diagram illustrating how the method of FIG. 5A operates on a table and its index.

FIG. 5B illustrates this process diagrammatically for table T1 (shown initially at 550*a*) and its unique index (shown initially at 555*a*). For Phase 1, each data record of table T1 is updated in direct mode, as shown at 550*b*. The corresponding index rows, on the other hand, are empty, as they have been deleted, as shown at 555*b*. Since these are empty, no conflict between key values arises. The system logs a deferred insert for these index rows. At Phase 2, the index is now updated, as indicated by index 555*c*, by performing the insert of the index rows. In this fashion, the update has been performed without violating any constraints on the unique index during the updating operation.

The corresponding log records for this sequence of operations is as follows:

| ACTION | COMMENT |
|---|---|
| Phase 1: | |
| XREC__IDELETE (INDEX ROW R1) | Delete index row R1 in direct mode |
| XREC__MODIFY (R1) | Modify row R1 in direct mode |
| XREC__INOOP (INDEX ROW R1) | Log deferred insert for index row R1 |
| XREC__IDELETE (INDEX ROW R2) | Delete index row R2 in direct mode |
| XREC__MODIFY (R2) | Modify row R2 in direct mode |
| XREC__INOOP (INDEX ROW R2) | Log deferred insert for index row R2 |
| XREC__IDELETE (INDEX ROW R3) | Delete index row R1 in direct mode |
| XREC__MODIFY (R3) | Modify row R3 in direct mode |
| XREC__INOOP (INDEX ROW R3) | Log deferred insert for index row R3 |
| Phase 2: | |
| XREC__IINSERT (INDEX ROW R1) | Insert index row R1 in deferred mode |
| XREC__IINSERT (INDEX ROW R2) | Insert index row R2 in deferred mode |
| XREC__IINSERT (INDEX ROW R3) | Insert index row R3 in deferred mode |

As shown by the log records, during Phase 1 the data records or rows are updated but the index rows are empty. Specifically, first the index row for record R1 is deleted in direct mode. Next, the R1 record itself is modified in direct mode. This is followed by a deferred insert (INOOP) of the index row for record RI. In a similar manner, records R2 and R3 are processed during Phase 1. The deferred insert of index rows for records R1, R2, and R3 are then processed in Phase 2. This is indicated by the INSERT log records. Note particularly that this approach allows much of the updating to be done in direct mode. As a result, the approach allows the system to avoid processing the same row twice, thereby leading to fewer input/output operations. In other words, all the rows which are being updated by the system have their first corresponding index entries removed at Phase 1. During Phase 2, these index entries are inserted.

During deletion of the index row(s), the process or task performing the operation takes out an exclusive lock on the corresponding index page. This prevents another transaction from accessing these rows; it will have to wait for the exclusive lock to be lifted. In this manner, inconsistent views of the rows which are deleted is avoided. In the currently preferred embodiment, page-level locks are employed. Systems supporting record-level locking, on the other hand, may take out record-level locks on those records which are deleted. Those skilled in the art will appreciate that locks of other levels of granularity may be employed in accordance with the teachings of the present invention, so long as inconsistent views of the rows which are deleted are avoided.

4. Application of methodology to scan indexes

The foregoing improvement to non-clustered, unique indexes can also be applied to "scan indexes." In the face of an update query of certain rows, the server must access rows to actually perform the update. The server can either perform a table scan (i.e., physically access the records) to determine which records to update or it can access an index, if available, for making this determination. The index, referred to as a "scan index," is employed by the Optimizer to determine which rows to update. If the key column for the scan index is modified (e.g., incrementing the key value by one) during the scan, the index "moves forward." To avoid processing the same row more than once, however, the approach of the present invention can be applied. Stated generally, therefore, given a unique index or a scan index which is "unsafe" (i.e., its key column is being modified) in an update query, the update to data rows is done directly, while the update to index rows is deferred. In this manner, scenarios requiring deferred updating can be performed in a manner which is largely a direct update operation.

Appended herewith is a Microfiche Appendix containing commented source code listings in the C Programming Language providing additional description of the present invention. A suitable C compiler for compiling the source listings is available from several vendors, including Microsoft of Redmond, WA, Borland International of Scotts Valley, Calif., Sun Microsystems of Mountain View, Calif., and Hewlett-Packard of Palo Alto, Calif.

While the invention is described in some detail with specific reference to a single preferred embodiment and certain alternatives, there is no intent to limit the invention to that particular embodiment or those specific alternatives. Those skilled in the art will appreciate that environments from other vendors may be configured in accordance with the present invention. Thus, the true scope of the present invention is not limited to any one of the foregoing exemplary embodiments but is instead defined by the appended claims.

What is claimed is:

1. In a database system having a database storing a database table comprising a plurality of data pages, each data page capable of storing a plurality of data records, said data records storing information organized into particular database fields, said database table having an index for logically ordering said plurality of data records, said index comprising a plurality of index entries wherein each data record is referenced by a corresponding index entry, said database system providing a direct mode, and a deferred mode for updating the database table and the index, said direct mode for performing actual updates to the database table or the index as each data record is read during a first pass, and said deferred mode for updating the database table or the index by first marking data records or index entries during the first pass for actual updating during a second pass, an improved method for updating said data records, the method comprising:

receiving a query which specifies a change in value for a database filed whose values form a unique index for the database table; and performing said update by:

in a first pass, scanning said data pages for said data records and changing any field value which is specified to change, so that said data records are updated in the direct mode, in conjunction with said scanning step occurring during the first pass, deleting any corresponding index entry which references a data record changed during said scanning step, so that any corresponding index entries are deleted in the direct mode, marking any index entry so deleted in the direct mode for inserting back into the index during a second pass, and after completing said scanning step of the first pass, inserting in the second pass all such corresponding index entries back into the index which were marked during the first pass for insertion during the second pass, so that all such corresponding index entries are inserted back into the index in the deferred mode.

2. The method of claim 1, wherein said index is employed by the system for enforcing entity integrity for the database table.

3. The method of claim 1, wherein said database field whose values are changed during scanning serves as a primary key for said database table.

4. The method of claim 1, wherein said index is a non-clustered index.

5. The method of claim 1, wherein said query specifies incrementing a value stored at the database field for each record, such that a primary key violation occurs during processing of the query but not upon completion of the query.

6. The method of claim 1, wherein said index comprises a B-Tree index.

7. The method of claim 6, wherein said B-Tree index includes a plurality of leaf-level nodes, each node storing one key value together with a record identifier for a corresponding data record which stores that key value.

8. The method of claim 1, wherein said scanning step is performed in a single pass, so that each data record is read only once for updating.

9. The method of claim 1, wherein said scanning step is performed in direct mode, such that no data records are updated in deferred mode.

10. The method of claim 1, wherein said query specifies an update which leads to a primary key violation for the database table and wherein said inserting an index entry step includes detecting said primary key violation.

11. In a database system having a database storing a database table comprising a plurality of data pages, each capable of storing a plurality of data records, said data records storing information organized into particular database fields, said database table having an index for logically ordering said plurality of data records, said index comprising a plurality of index entries wherein each data record is referenced by a corresponding index entry, said database system providing a direct mode and a deferred mode for updating the database table and the index, said direct mode for performing actual updates to the database table or the index as each data record is read during a first pass, and said deferred mode for updating be database table or the index by first marking data records or index entries during the first pass for actual updating during a second pass, an improved method for updating said data records, the method comprising:

receiving a query which specifies a change in value for a database field such that a particular data record, once updated, overflows a corresponding data page where the record is stored; and performing said update by:
in a first pass, deleting the particular data record which overflows the data page when said database page is first read, so that said particular data record is deleted in the direct mode,
in conjunction with said deleting step occurring during the first pass, marking said particular data record for inserting back into the database table during a second pass, which is to be perform after all data pages required for processing the query have been scanned, and
after completing scanning of all data pages, inserting in the second pass the marked particular data record into the database table at a particular data page, wherein the marked particular data record is inserted in the deferred mode such that only the particular data page need be read after completion of said scanning.

12. The method of claim 11, wherein said particular data record is a variable-length data record and wherein said query increases the size of said particular data record such that it exceeds storage space available on the data page where the record is stored.

13. The method of claim 11, further comprising:
in conjunction with said deleting step, deleting a corresponding index record for said particular data record.

14. The method of claim 13, further comprising:
after completing said insertion of the particular data record which overflowed the data page, inserting the corresponding index row for said particular data record.

15. The method of claim 11, further comprising:
updating other data records which do not overflow said corresponding data page when said corresponding data is first read.

16. The method of claim 11, further comprising:
updating in direct mode other data records which do not overflow said corresponding data page, so that said other data records can be updated without having to re-read said corresponding data page.

17. The method of claim 11, wherein said index is a non-clustered index.

18. The method of claim 11, wherein said index is a clustered index.

19. The method of claim 11, wherein said corresponding data page includes a directory of data records on that page and wherein said directory is preserved for other data records on the page by deleting any data record which, once updated, overflows the data page.

20. The method of claim 11, wherein said index comprises a B-Tree index.

21. In a database system having a database storing a database table comprising a plurality of data pages for storing data records, said data records storing information organized into particular database fields, said database table having an index for logically ordering said plurality of data records, said index comprising a plurality of index records wherein each data record is referenced by a corresponding index record, said database system providing a direct mode and a deferred mode for updating the database table and the index, said direct mode for performing actual updates to the database table or the index as each data record is read during a first pass, and said deferred mode for updating the database table or the index by first marking data records or index records during the first pass for actual updating during a second pass, an improved method for updating said data records, the method comprising:

receiving a query specifying updating of data records which are indexed, each data record being associated with an index record storing a key value for the data record together with an identifier for that data record; and updating said data records by:
updating the data records in the direct mode, so that all data records which can be updated are updated in a first pass,
for any data record updated in the direct mode, deleting its associated index record also in the direct mode and marking said associated index record so deleted for insertion in a second pass, and
inserting in the second pass each index record which has been marked during the first pass, so that each such index record is inserted in the deferred mode.

22. The method of claim 21, wherein said query specifies an update which causes a temporary primary key violation when said data records are updated one by one.

23. The method of claim 21, wherein said index is a unique index for said database table, and wherein said query modifies values which contribute to the index having a uniqueness constraint, and wherein said index cannot be updated in the direct mode without violating the uniqueness constraint.

24. The method of claim 21, wherein said index is a B-Tree index.

25. The method of claim 21, wherein a data record is updated in direct mode by deleting an existing copy of the data record and inserting a new copy of that data record.

26. A client/server database system having a database storing a database table comprising a plurality of data pages for storing data records, said data records storing information organized into particular database fields, said database table having an index for logically ordering said plurality of data records, said index comprising a plurality of index records-wherein each data record is referenced by a corresponding index record, the system including means for updating sad data records and said index, the system comprising:

a server connected to a client;
means for transmitting from the client to the server a query specifying updating of data records which are indexed, each data record being associated with an index record storing a key value for the data record together with an identifier for that data record; and
means for updating said data records at the server by:
providing a direct mode and a deferred mode for updating the database table and the index, sad direct mode for performing actual updates to the database table or the index as each record is read during a first pass, and said deferred mode for updating the database table or the index by first marking data records or index records during the first pass for actual updating during a second pass;

receiving a query specifying updating of data records which are indexed, each data record being associated with an index record storing a key value for the data record together with an identifier for that data record; and updating said data records by:

updating the data records in the direct mode, so that all data records which can be updated are updated in a first pass, for any data record updated in the direct mode, deleting its associated index record also in direct mode and marking said associated index record so deleted for insertion in a second pass, and inserting in the second pass each index record which has been marked during the first pass, so that each such index record is inserted in the deferred mode.

\* \* \* \* \*